United States Patent
Chimura

(10) Patent No.: US 9,626,143 B2
(45) Date of Patent: Apr. 18, 2017

(54) IMAGE FORMING DEVICE THAT IMPROVES USAGE EFFICIENCY OF MEMORY, MANAGEMENT METHOD, AND RECORDING MEDIUM

(71) Applicant: KYOCERA Document Solutions Inc., Osaka (JP)

(72) Inventor: Tetsuyuki Chimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/677,463

(22) Filed: Apr. 2, 2015

(65) Prior Publication Data

US 2015/0293736 A1 Oct. 15, 2015

(30) Foreign Application Priority Data

Apr. 14, 2014 (JP) ................. 2014-083215

(51) Int. Cl.
  *G06F 3/12* (2006.01)
  *G06K 15/02* (2006.01)

(52) U.S. Cl.
  CPC ....... *G06F 3/1296* (2013.01); *G06K 15/1856* (2013.01); *G06K 15/1861* (2013.01); *H04N 2201/0094* (2013.01)

(58) Field of Classification Search
  CPC .............. G06F 3/1296; G06K 15/1817; G06K 2215/0065; H04N 2201/0094
  USPC ................................................ 358/1.13, 1.16
  See application file for complete search history.

(56) References Cited

U.S. PATENT DOCUMENTS

| | | | | |
|---|---|---|---|---|
| 5,159,681 A | * | 10/1992 | Beck | G06K 15/00 358/1.17 |
| 6,025,923 A | * | 2/2000 | Kageyama | G06F 3/1296 358/1.1 |
| 6,040,917 A | * | 3/2000 | Campbell | G06K 15/02 358/1.17 |
| 6,556,309 B1 | * | 4/2003 | Campbell | G06K 15/00 358/1.14 |
| 2003/0063316 A1 | | 4/2003 | Irino | 358/1.16 |

FOREIGN PATENT DOCUMENTS

JP  2003-200620 A  7/2003

* cited by examiner

*Primary Examiner* — Paul F Payer
(74) *Attorney, Agent, or Firm* — Stein IP, LLC

(57) ABSTRACT

A first-region allocating unit of an electronic device allocates a first region having a size required for a first process. The first process includes at least one second process in a region of the memory. A second-region dividing unit divides a second region having a size required for the second process by the second process. A region-for-release dividing unit divides a region for release from the first region when the second-region dividing unit has allocated the second regions for all the second processes included in the first process. The region for release is a region other than the second region and to be released. The second-region dividing unit divides the second region regardless of a page basis used as a unit in the memory management. The region-for-release dividing unit divides the region for release on the page basis.

3 Claims, 7 Drawing Sheets

IMAGE FORMING DEVICE THAT IMPROVES USAGE EFFICIENCY OF MEMORY, MANAGEMENT METHOD, AND RECORDING MEDIUM

INCORPORATION BY REFERENCE

This application is based upon, and claims the benefit of priority from, corresponding Japanese Patent Application No. 2014-083215 filed in the Japan Patent Office on Apr. 14, 2014, the entire contents of which are incorporated herein by reference.

BACKGROUND

Unless otherwise indicated herein, the description in this section is not prior art to the claims in this application and is not admitted to be prior art by inclusion in this section.

A typical electronic device divides a region required for processes in a memory region only on a page basis used as a unit in the memory management. The typical electronic device can perform the memory management adapted for an architecture of Operating System (OS), which performs the memory management on a page basis, thus increasing the speed of processing.

SUMMARY

An electronic device according to an aspect of the present disclosure includes a memory, a first-region allocating unit, a second-region dividing unit, and a region-for-release dividing unit. The first-region allocating unit allocates a first region having a size required for a first process. The first process includes at least one second process in a region of the memory. The second-region dividing unit divides a second region having a size required for the second process by the second process in the first region. The region-for-release dividing unit divides a region for release from the first region when the second-region dividing unit has allocated the second regions for all the second processes included in the first process. The region for release is a region other than the second region and to be released. The second-region dividing unit divides the second region regardless of a page basis used as a unit in the memory management. The region-for-release dividing unit divides the region for release on the page basis.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
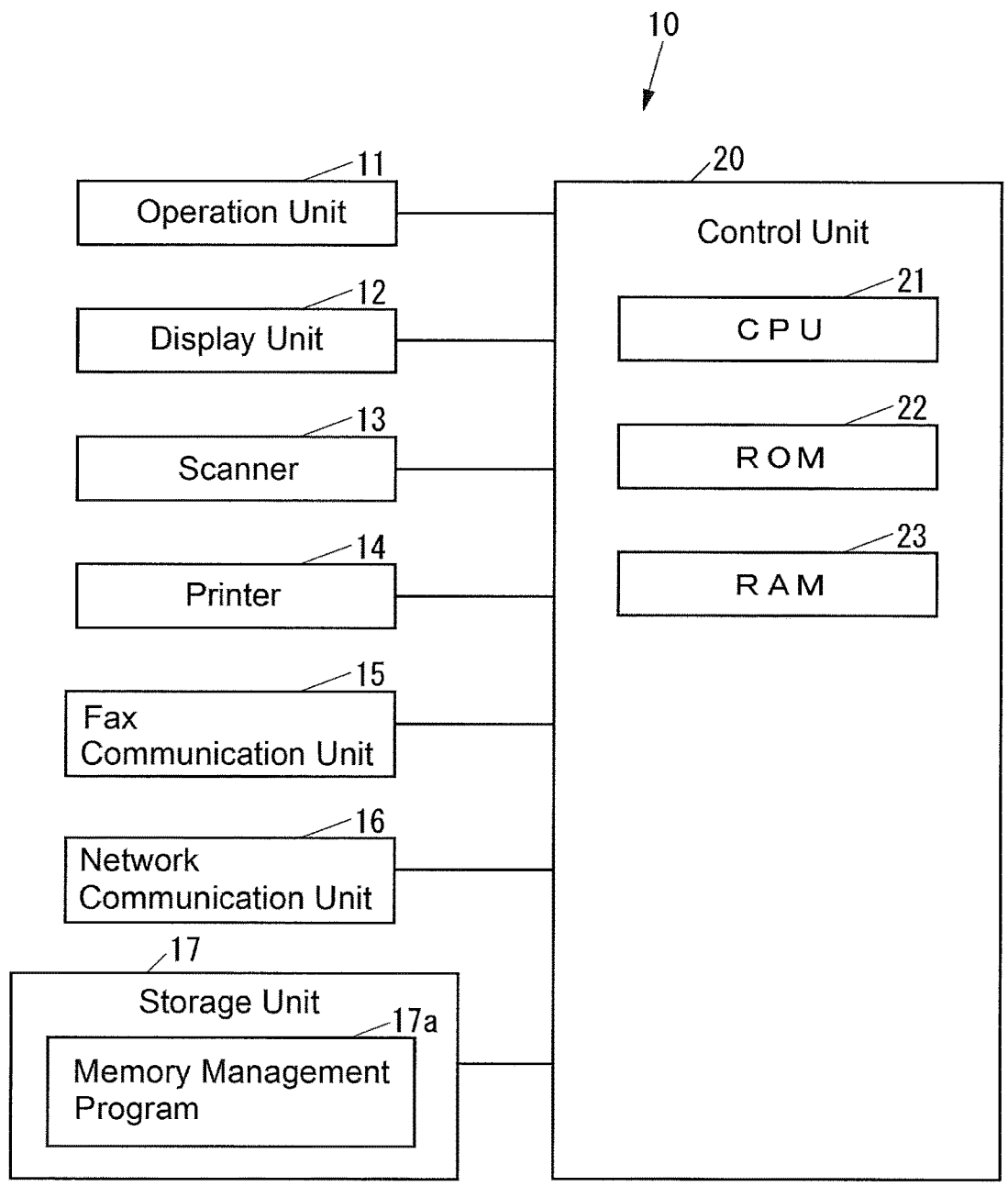
FIG. 1 is a schematic diagram illustrating a functional block configuration of an MFP according to one embodiment of the present disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereinafter, one embodiment of the disclosure will be described with reference to the attached drawings.

First, a functional configuration of a Multifunction Peripheral (MFP) as an electronic device according to the embodiment will be described.

FIG. 1 illustrates the functional configuration of an MFP 10 according to the embodiment.

As illustrated in FIG. 1, the MFP 10 includes an operation unit 11, a display unit 12, a scanner 13, a printer 14, a fax communication unit 15, a network communication unit 16, a storage unit 17, and a control unit 20. The operation unit 11 may be an input device such as a button for inputting various operations by a user. The display unit 12 may be a display device such as a Liquid Crystal Display (LCD) that displays various information. The scanner 13 may be a reading device that reads an image from an original document. The printer 14 may be a print device that executes a print job on a recording medium such as a paper sheet. The fax communication unit 15 may be a fax device that performs fax communication with an external facsimile device (not illustrated) via a communication line such as a dial-up line. The network communication unit 16 may be a network communication device that communicates with an external device (not illustrated) via the network such as Local Area Network (LAN) and/or Internet. The storage unit 17 may be a non-volatile storage device such as an Electrically Erasable Programmable Read Only Memory (EEPROM) and a Hard Disk Drive (HDD) that store various kinds of data. The control unit 20 controls the entire MFP 10.

The control unit 20 includes, for example, a Central Processing Unit (CPU) 21, a Read Only Memory (ROM) 22, which is a non-transitory recording medium and stores the program and various kinds of data, and a Random Access Memory (RAM) 23 as a memory used as a work region of the CPU 21. The CPU 21 executes the programs that are stored in the ROM 22 or the storage unit 17.

The storage unit 17 stores a memory management program 17*a* for controlling the RAM 23. The memory management program 17*a* may be installed on the MFP 10 at production stage of the MFP 10, may be additionally installed on the MFP 10 from a storage medium such as an SD card and a Universal Serial Bus (USB) memory, or may be additionally installed on the MFP 10 via a network.

Figure 2:
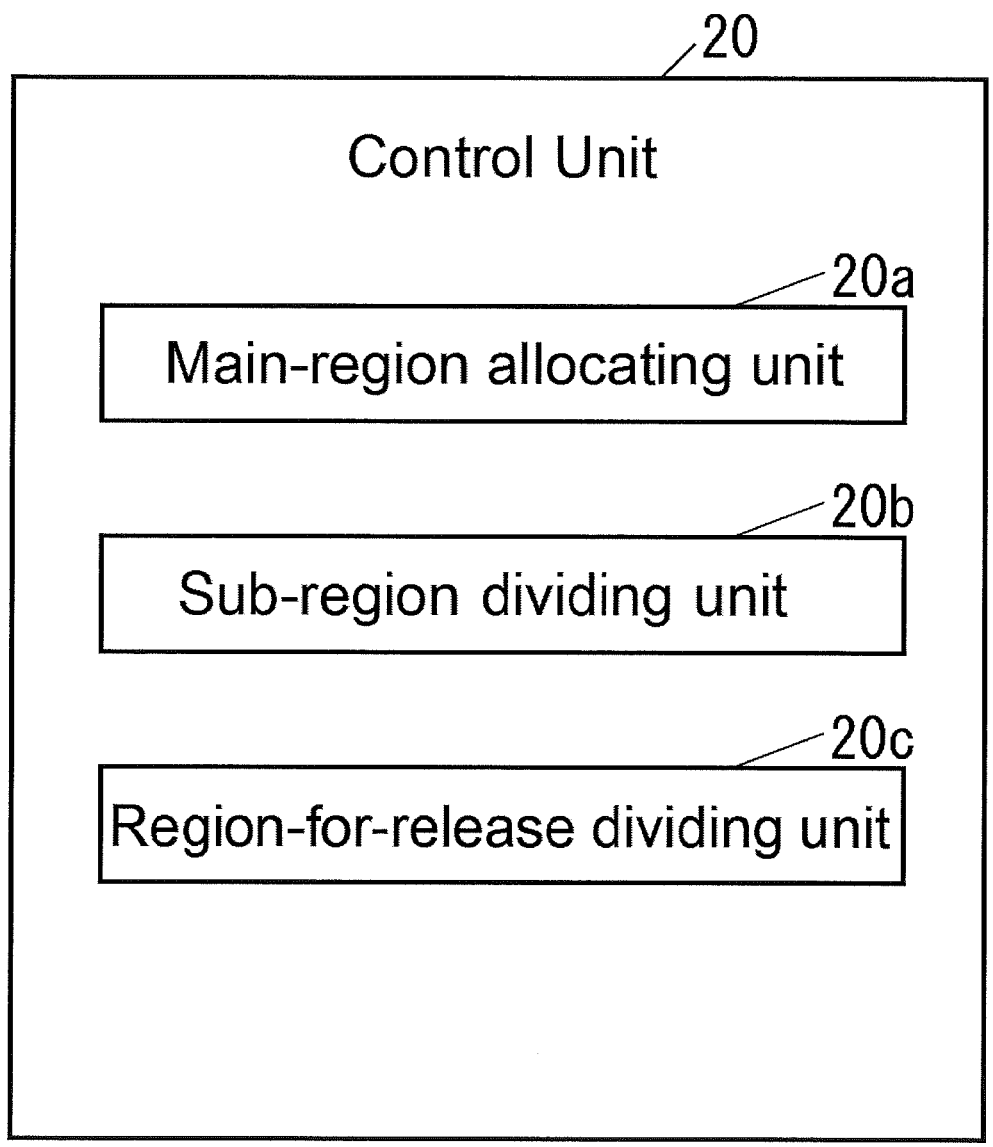
FIG. 2 is a schematic diagram illustrating a functional block configuration of a control unit according to the one embodiment.

FIG. 2 illustrates a function block configuration of the control unit 20.

The control unit 20 executes the memory management program 17*a* stored in the storage unit 17 to function as the following units in a region of the RAM 23 (see FIG. 1) as illustrated in FIG. 2: a main-region allocating unit 20*a* as a first-region allocating unit that allocates a main region as a first region; a sub-region dividing unit 20*b* as a second-region dividing unit that divides a sub region as a second region in the main region allocated by the main-region allocating unit 20*a*; and a region-for-release dividing unit 20*c* that divides a region for release, which is a region other than the sub region and to be released from the main region allocated by the main-region allocating unit 20*a*. Here, the main region is a region for a main process as a first process. The sub region is a region for a sub process as a second process, one or more of which is included in the main process.

Next, operations of the MFP 10 when managing the RAM 23 will be described.

Hereafter, a description will be given of the case where a process for one page of the image is the main process, and the processes for respective parts when dividing one page of the image into the plurality of parts are the sub processes.

Figure 3:
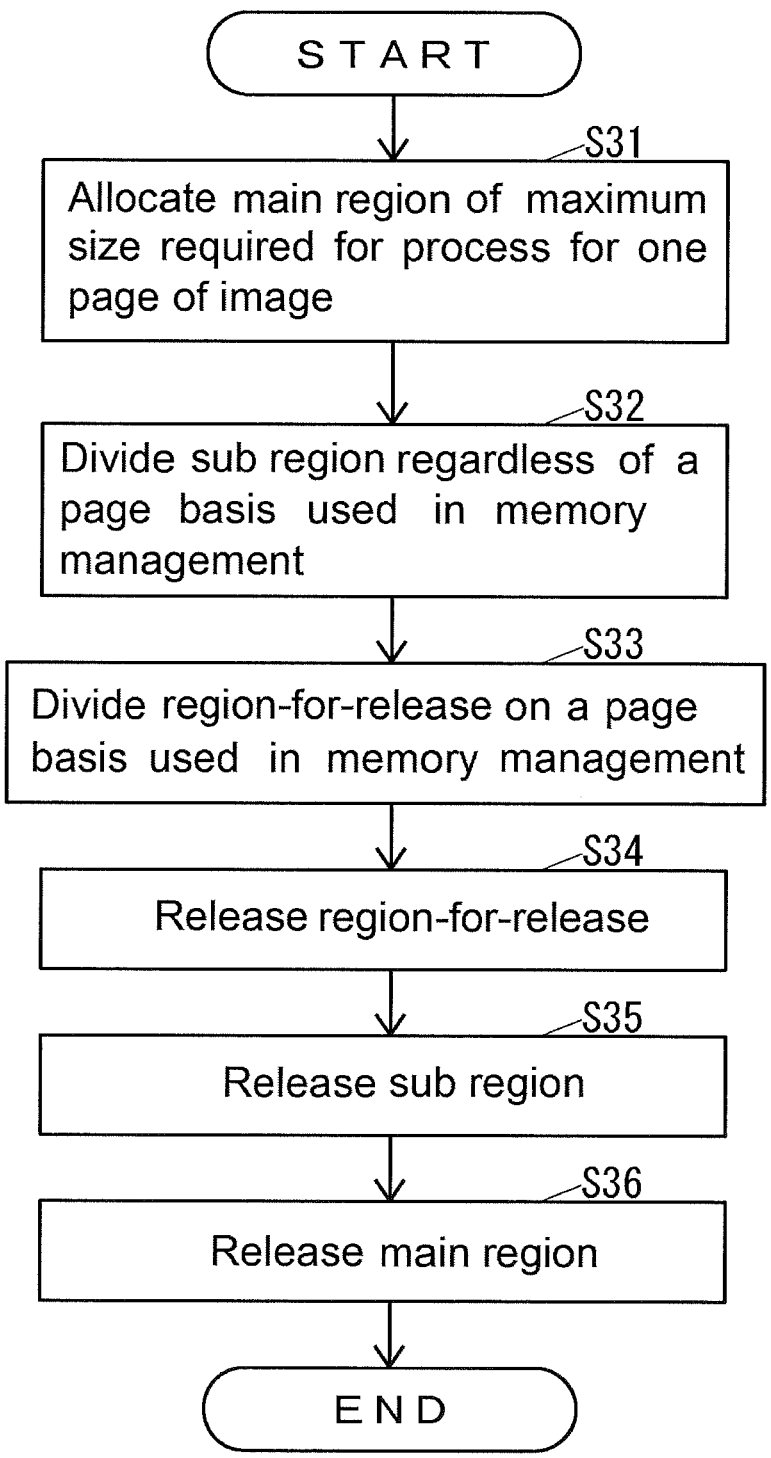
FIG. 3 is a flowchart of operations of the MFP according to the one embodiment when managing a RAM.

FIG. 3 is a flowchart of the operations of the MFP 10 when managing the RAM 23.

The control unit 20 in the MFP 10 performs the operations illustrated in FIG. 3 upon initiation of the process for one page of the image.

As illustrated in FIG. 3, the main-region allocating unit 20*a* of the control unit 20 allocates the main region having the maximum size required for the process for one page of the image in the region of the RAM 23 (S31).

Here, the main-region allocating unit 20*a* determines the maximum size required for the process for one page of the image. The main-region allocating unit 20*a* determines it based on the largest paper sheet size assumed in a printing process performed by the printer 14 based on print data received via the network communication unit 16, when, for example, the printing process is performed by the printer 14 based on the print data received via the network communication unit 16 as the main process. The main-region allocating unit 20*a* determines the maximum size required for the process for one page of the image based on the size of the original document read by the scanner 13, when, for example, the process that uses the scanner 13, such as a copy function, is the main process.

Figure 4A:
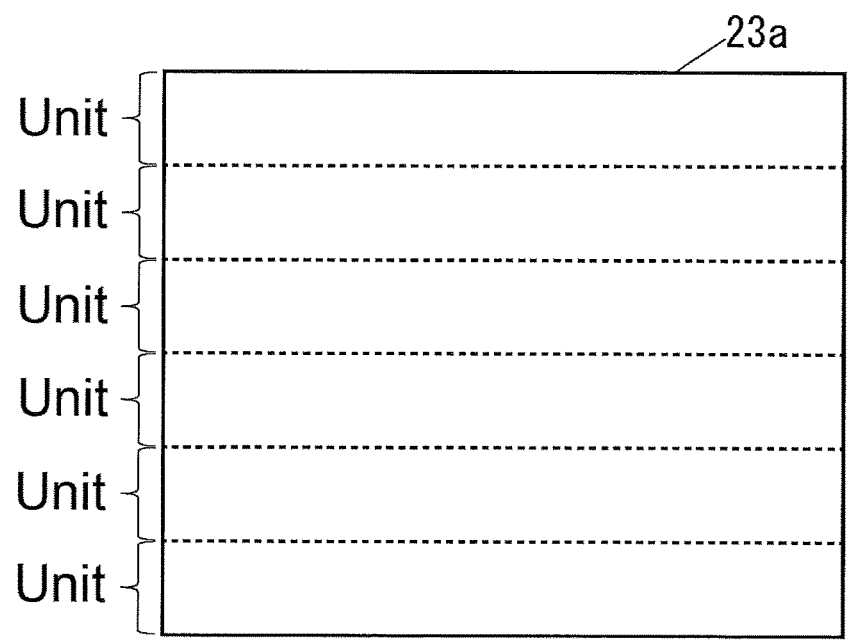
FIG. 4A is a schematic diagram illustrating an example of a main region in a RAM region according to the one embodiment.

For example, as illustrated in FIG. 4A, the main-region allocating unit 20*a* allocates a main region 23*a* for six units on a page basis used as a unit in the memory management (hereinafter referred to as "page basis used in the memory management") in the process of Step S31.

The sub-region dividing unit 20*b* of the control unit 20 is requested the division of the sub region by a process executing the sub process after the process of Step S31. Consequently, the sub-region dividing unit 20*b* divides the sub region having the required size for the sub process in the main region allocated in Step S31 (Step S32). That is, the sub-region dividing unit 20*b* divides the sub region having the size required for the sub process, regardless of a page basis used in the memory management, for every sub process in the main region allocated by the main-region allocating unit 20*a*.

Here, the sub-region dividing unit 20*b* segments a region equivalent to a specified size from a specified position (offset) and divides the sub region in such manner as allocating fragmented buffer upon request in the main region allocated in Step S31. The specified position is a position located from the beginning of the main region allocated in Step S31. The sub-region dividing unit 20*b* updates the specified position by a size of the divided sub region whenever dividing the sub region. The specified size is a size specified by the process executing the sub process.

Figure 4B:
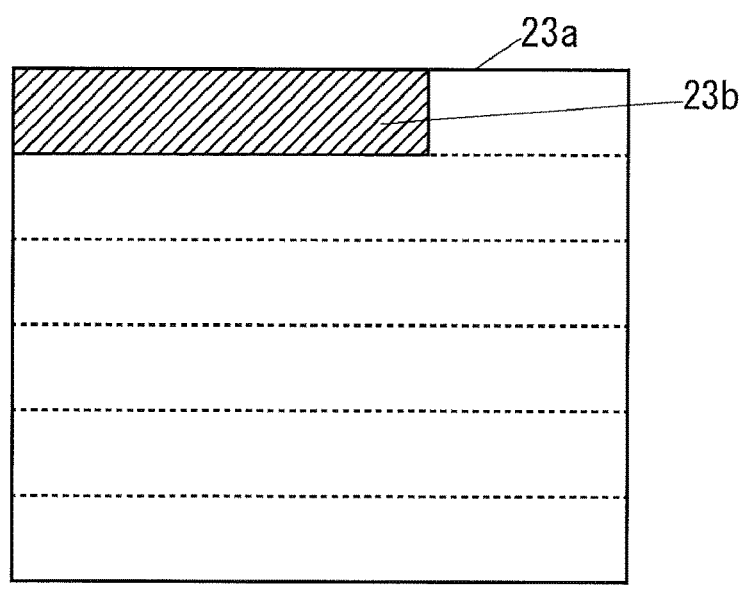
FIG. 4B is a schematic diagram illustrating the main region according to one embodiment when one sub region is divided.
Figure 4C:
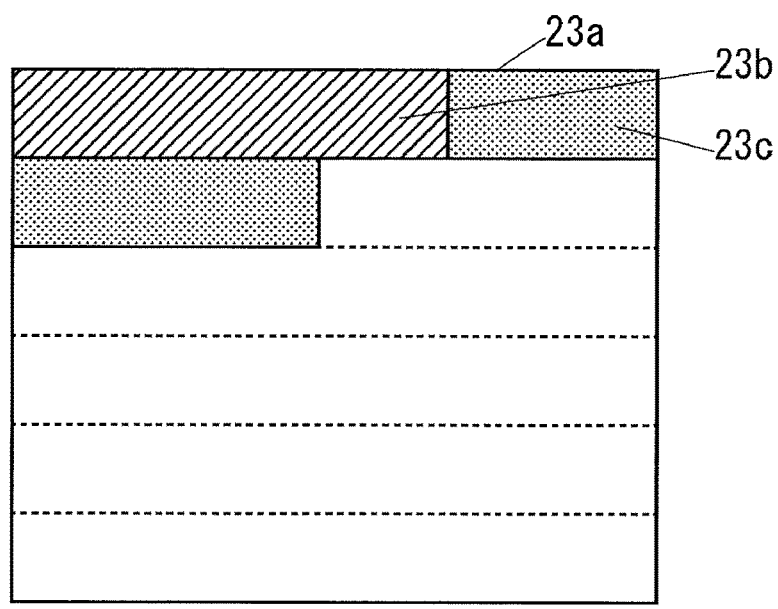
FIG. 4C is a schematic diagram illustrating the main region when another one sub region is divided from the state illustrated in FIG. 4B.
Figure 5A:
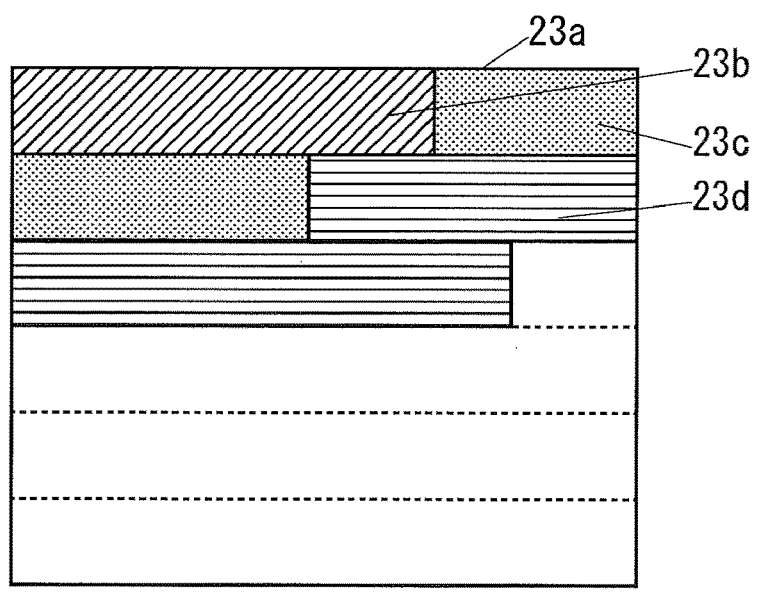
FIG. 5A is a schematic diagram illustrating the main region when yet another one sub region is additionally divided from the state illustrated in FIG. 4C.

For example, as illustrated in FIGS. 4B, 4C, and 5A, the sub-region dividing unit 20*b* divides sub regions 23*b*, 23*c*, and 23*d* successively in the order in the process of Step S32, where the main region 23*a* immediately prior to the process of Step S32 is in a state as illustrated in FIG. 4A.

The region-for-release dividing unit 20*c* of the control unit 20 divides the region for release on a page basis used in the memory management from the main region allocated in Step S31 when the sub regions are allocated in Step S32 for every sub processes included in the main process (Step S33).

Figure 5B:
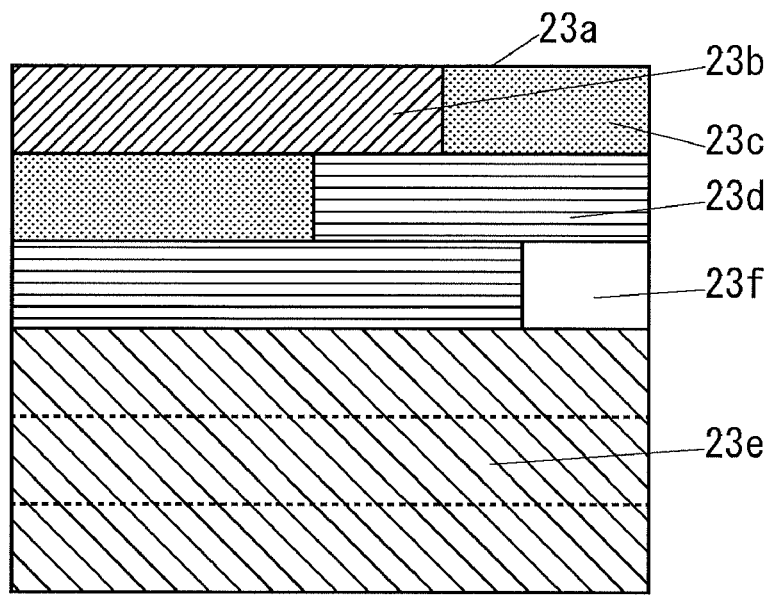
FIG. 5B is a schematic diagram illustrating the main region and a region for release when the region for release is divided from the state illustrated in FIG. 5A.

For example, as illustrated in FIG. 5B, the region-for-release dividing unit 20*c* divides a region for release 23*e* in the process of Step S33 when the main region 23*a* immediately prior to the process of Step S33 is in a state as illustrated in FIG. 5A.

The control unit 20 releases the region for release divided in Step S33 after the process of Step S33 (Step S34).

Figure 5C:
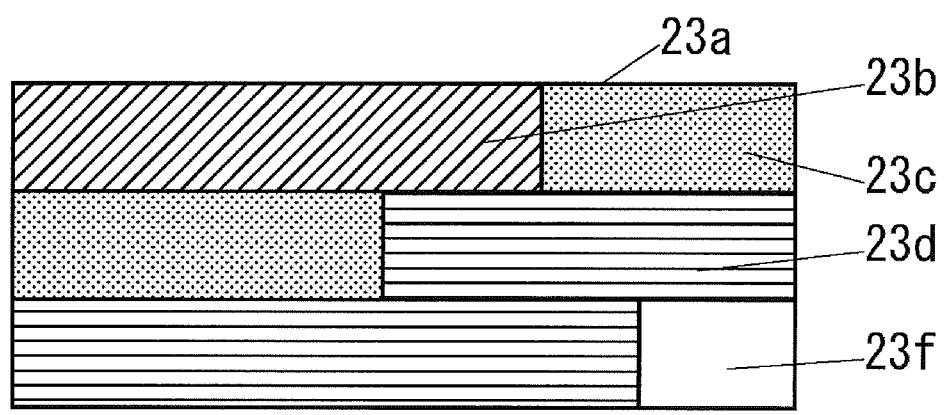
FIG. 5C is a schematic diagram illustrating the main region when the region for release is released from the state illustrated in FIG. 5B.

For example, as illustrated in FIG. 5C, the control unit 20 releases the region for release 23*e* (see FIG. 5B) in the process of Step S34 when the main region 23*a* immediately prior to the process of Step S34 is in a state as illustrated in FIG. 5B. Accordingly, as illustrated in FIGS. 5B and 5C, the main region 23*a* decreases in size equivalent to from six units to three units on a page basis used in the memory management.

The control unit 20 releases the sub region for the terminated sub process whenever the sub process is terminated after the process of Step S34 (Step S35).

Subsequently, the control unit 20 releases the main region 23*a* (Step S36) to terminate the operations illustrated in FIG. 3 when the process of Step S35 is executed with respect to every sub processes included in the main process.

As described above, the MFP 10 divides the sub region by an actually required size, regardless of a page basis used in the memory management (Step S32), thus improving the usage efficiency of the RAM 23.

Figure 6:
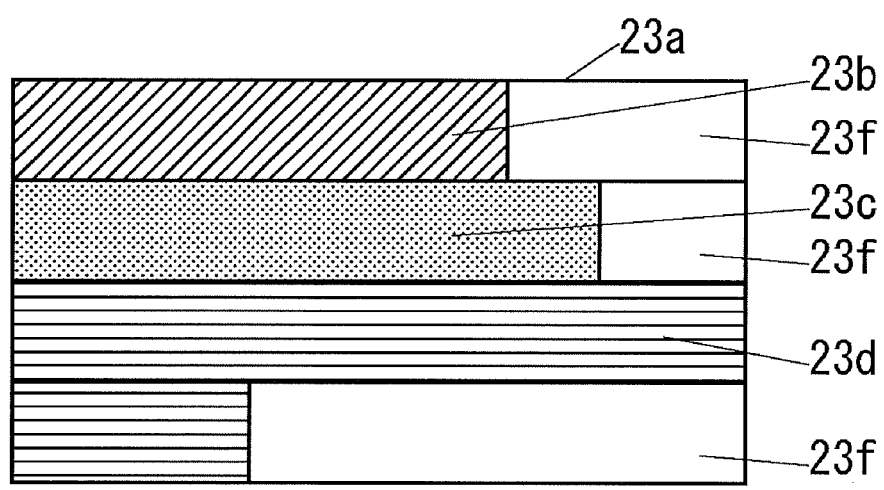
FIG. 6 is a schematic diagram illustrating an example of the main region in the RAM region illustrated in FIG. 1 when assuming a sub region is divided on a page basis used in a memory management.

For example, assuming that the sub regions 23*b* to 23*d* illustrated in FIG. 5A are divided on a page basis used in the memory management in Step S32, the main region 23*a* finally has the size equivalent to four units on a page basis used in the memory management as illustrated in FIG. 6. Here, the respective sub regions 23*b* to 23*d* are divided on a page basis used in the memory management as illustrated in FIG. 6, and this causes an excessive allocation of useless regions 23*f* and unused for the sub process in practice. However, the MFP 10 can divide the sub region by the actually required size, regardless of a page basis used in the memory management. As illustrated in FIG. 5C, this ensures the greater reduction of the useless regions 23*f*, which is unused for the sub process in practice, compared with the example illustrated in FIG. 6. That is, as illustrated in FIG. 5C, the main region 23*a* finally has the size equivalent to three units on a page basis used in the memory management. Thus, the MFP 10 can further reduce the region of the RAM 23 by the size equivalent to one unit on a page basis used in the memory management compared with the example illustrated in FIG. 6.

With the MFP 10, the main process is the process for one page of the image. Therefore, the MFP 10 can improve the usage efficiency of the RAM 23 (memory) when performing the process for one page of the image. The main process may also include any processes other than the process for one page of the image.

The electronic device of the disclosure is an MFP according to the embodiment. However, the electronic device may be an image forming apparatus other than the MFP such as a printer-only machine, a copy-only machine, a FAX-only machine, or may be an electronic device other than the image forming apparatus such as Personal Computer (PC).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming device comprising:
a printer;
a scanner;
a network communication unit;
a memory; and
a central processing unit (CPU) as a controller, wherein the CPU is configured for:
i) allocating a first region having a maximum size required for a first process, the first process being a main process that includes a plurality of sub processes as a plurality of second processes,
wherein the first process includes a process for one page of an image, and the plurality of second processes include processes for each of a plurality of parts when dividing one page of the image into the plurality of parts;
ii) determining the first region having the maximum size, if the first process is a printing process performed by the printer, based on the largest paper sheet size of print data received via the network communication unit in the printing process;
iii) determining the first region having the maximum size, if the first process is a process that uses the scanner including a copy function, based on the size of an original document read by the scanner;
iv) dividing the first region into a plurality of second regions having a specified size required for each of the plurality of second processes, from a specified position in the first region,
wherein the specified position is located from the beginning of the first region, and is updated by a size of a second region whenever dividing the first region into each of the plurality of second regions, regardless of a page basis used as a unit in a memory management; and
v) releasing a region for release from the first region when the plurality of second regions have been allocated for all second processes included in the first process,
wherein the region for release is the first region other than the plurality of second regions and is released on the page basis used as the unit in the memory management.

2. A method of memory management for an image forming device, the image forming device including: a printer; a scanner; a network communication unit; a memory; and a central processing unit (CPU) as a controller, the method comprising:
via the CPU,
i) allocating a first region having a maximum size required for a first process, the first process being a main process that includes a plurality of sub processes as a plurality of second processes,
wherein the first process includes a process for one page of an image, and the plurality of second processes include processes for each of a plurality of parts when dividing one page of the image into the plurality of parts;
ii) determining the first region having the maximum size, if the first process is a printing process performed by the printer, based on the largest paper sheet size of print data received via the network communication unit in the printing process;
iii) determining the first region having the maximum size, if the first process is a process that uses the scanner including a copy function, based on the size of an original document read by the scanner;
iv) dividing the first region into a plurality of second regions having a specified size required for each of the plurality of second processes, from a specified position in the first region,
wherein the specified position is located from the beginning of the first region, and is updated by a size of a second region whenever dividing the first region into each of the plurality of second regions, regardless of a page basis used as a unit in a memory management; and
v) releasing a region for release from the first region when the plurality of second regions have been allocated for all second processes included in the first process,
wherein the region for release is the first region other than the plurality of second regions and is released on the page basis used as the unit in the memory management.

3. A non-transitory computer-readable recording medium storing a control program to control a computer of an image forming device,
the image forming device including: a printer; a scanner; a network communication unit; a memory; and a central processing unit (CPU) as a controller,
the control program causing the CPU to be configured for:
i) allocating a first region having a maximum size required for a first process, the first process being a main process that includes one or more sub processes as second processes,
wherein the first process includes a process for one page of an image, and the second processes include one or more processes for respective parts when dividing one page of the image into the plurality of parts;
ii) determining the first region having the maximum size, if the first process is a printing process performed by the printer, based on the largest paper sheet size of print data received via the network communication unit in the printing process;
iii) determining the first region having the maximum size, if the first process is a process that uses the scanner including a copy function, based on the size of an original document read by the scanner;

iv) dividing the first region into a plurality of second regions having a specified size required for each of the plurality of second processes, from a specified position in the first region, wherein the specified position is located from the beginning of the first region, and is updated by a size of a second region whenever dividing the first region into each of the plurality of second regions, regardless of a page basis used as a unit in a memory management; and v) releasing a region for release from the first region when the plurality of second regions have been allocated for all second processes included in the first process, wherein the region for release is the first region other than the plurality of second regions and is released on the page basis used as the unit in the memory management.

* * * * *